United States Patent
Zhang et al.

(10) Patent No.: US 8,491,250 B2
(45) Date of Patent: Jul. 23, 2013

(54) PALLETIZING ROBOT

(75) Inventors: Guo-Qing Zhang, Shenzhen (CN); Qi-Jun Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 372 days.

(21) Appl. No.: 12/944,920

(22) Filed: Nov. 12, 2010

(65) Prior Publication Data
US 2011/0268549 A1    Nov. 3, 2011

(30) Foreign Application Priority Data
Apr. 28, 2010    (CN) .......................... 2010 1 0157207

(51) Int. Cl.
*B66F 9/075* (2006.01)
*B25J 9/04* (2006.01)

(52) U.S. Cl.
USPC .......................... 414/673; 74/490.01; 187/404

(58) Field of Classification Search
USPC   74/490.01; 187/404; 212/195, 197; 248/648; 414/662, 673, 744.1, 744.3; 901/15, 48
See application file for complete search history.

(56) References Cited

U.S. PATENT DOCUMENTS

| | | | | |
|---|---|---|---|---|
| 2,915,919 A | * | 12/1959 | Mitchell et al. | 74/590 |
| 4,502,830 A | * | 3/1985 | Inaba et al. | 414/735 |
| 4,759,674 A | * | 7/1988 | Schroder et al. | 414/146 |
| 4,907,768 A | * | 3/1990 | Masseron et al. | 248/123.11 |
| 7,476,072 B2 | * | 1/2009 | Tamura | 414/749.1 |
| 7,918,639 B2 | * | 4/2011 | Fink et al. | 414/744.6 |
| 2008/0253876 A1 | * | 10/2008 | Sandmeier | 414/744.3 |

FOREIGN PATENT DOCUMENTS

| CN | 201052949 Y | | 4/2008 |
|---|---|---|---|
| CN | 201198314 Y | | 2/2009 |
| CN | 200910301845 | * | 4/2009 |

* cited by examiner

*Primary Examiner* — Scott Lowe
(74) *Attorney, Agent, or Firm* — Altis Law Group, Inc.

(57) ABSTRACT

A palletizing robot includes a lifting frame, an end-effector, an extensible mechanical arm, and a balancing mechanism. The extensible mechanical arm is rotatably connected to the lifting frame. The balancing mechanism and the end-effector are located on opposite ends of the extensible mechanical arm. The balancing mechanism includes a threaded rod, a sliding member, a driving member, and a counterweight. The threaded rod is located on the extensible mechanical arm. The sliding member receives the threaded rod. The driving member is fixed on an end of the threaded rod. The counterweight is fixed on the sliding member. The driving member rotates the threaded rod such that the sliding member slides relative to the threaded rod.

15 Claims, 6 Drawing Sheets

PALLETIZING ROBOT

BACKGROUND

1. Technical Field

The present disclosure relates to robotics, and particularly, to a palletizing robot.

2. Description of the Related Art

Industrial robots are widely used in various applications to greatly reduce the burden of factory workers. An industrial robot such as a palletizing robot, is used to stack objects for transport or storage.

A palletizing robot includes a rotary base, a lifting frame, an extensible mechanical arm, an end-effector, and a counterweight. The lifting frame is fixed on the rotary base. The extensible mechanical arm is slidably connected to the lifting frame. The end-effector and the counterweight are fixed on opposite ends of the extensible mechanical arm. An extension of the extensible mechanical arm is controlled by a controller. When the end-effector clamps an object, the object can be moved to any position in a three dimensional space depending on the rotation of the rotary base, and the sliding position and the extension of the extensible mechanical arm. However, when the extension of the extensible mechanical arm or the weight of the objects is changed, the counterweight is not in balance. Thus, balance performance of the palletizing robot is lower because of the bending moment.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
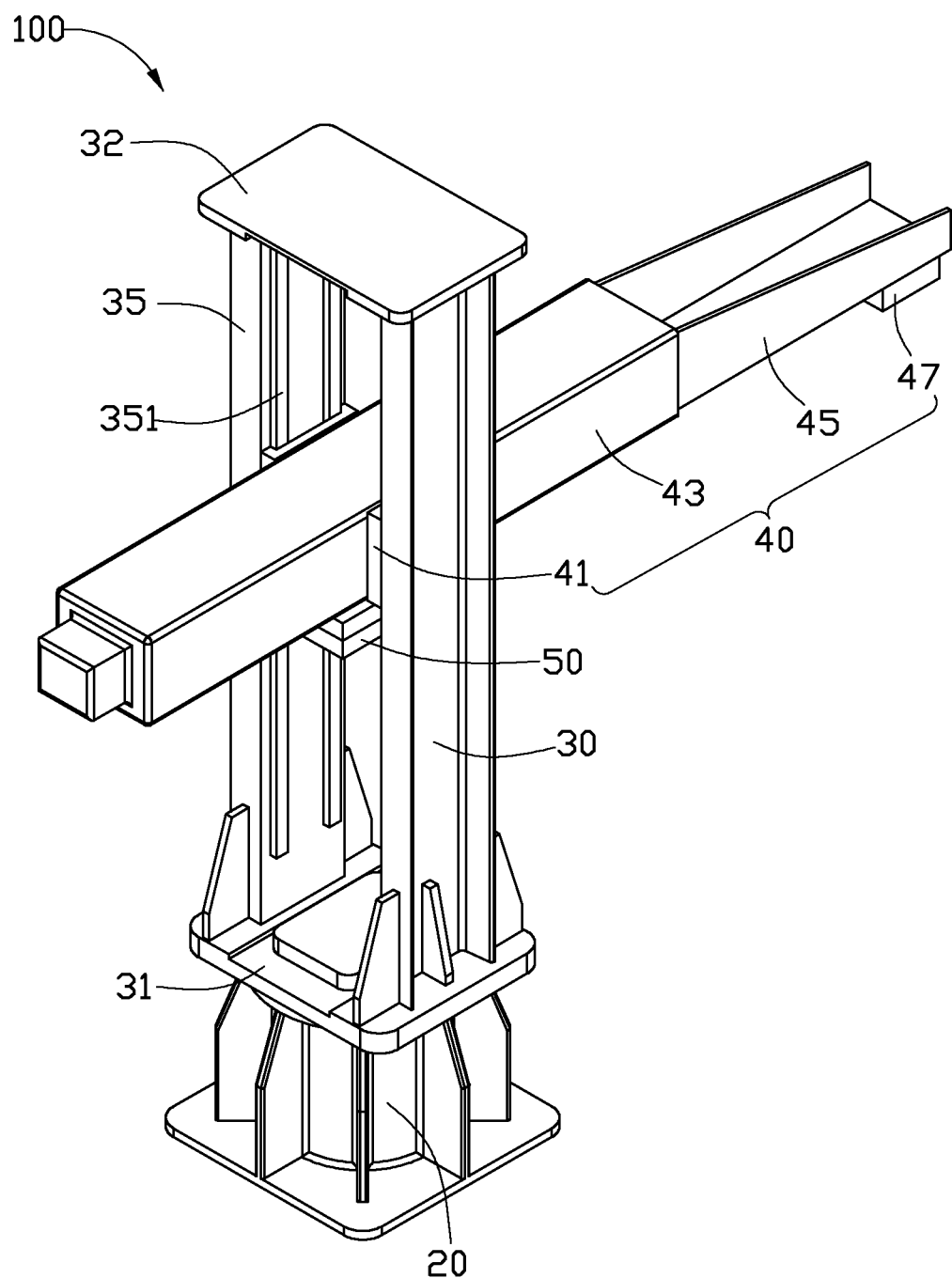
FIG. 1 is an assembled, isometric view of an embodiment of a palletizing robot, the palletizing robot including an extensible mechanical arm and a balancing mechanism having a sliding member.
Figure 2:
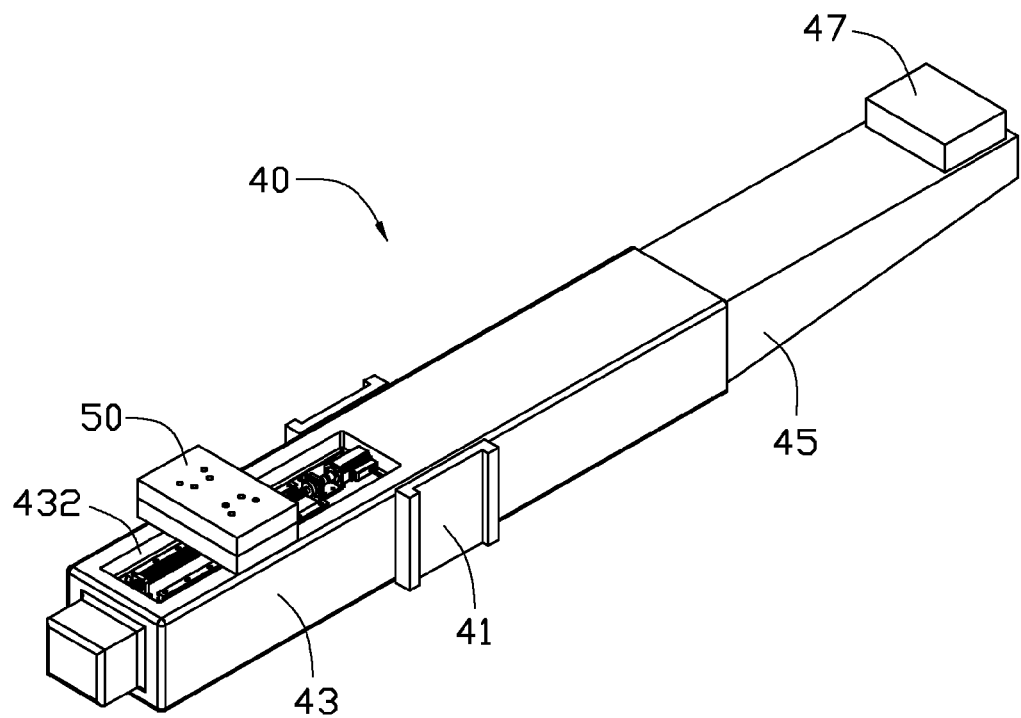
FIG. 2 is an isometric view of the extensible mechanical arm shown in FIG. 1.
Figure 6:
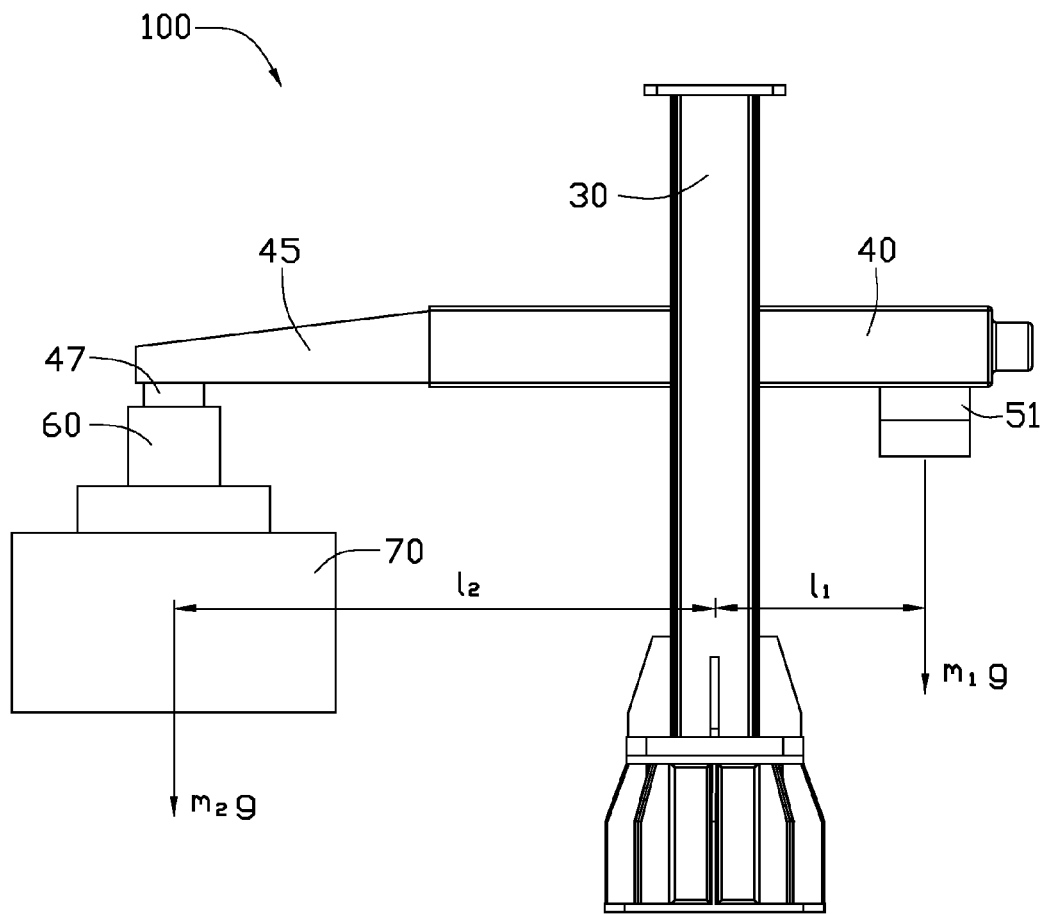
FIG. 6 is planar view showing a work state of the palletizing robot.

Referring to FIGS. 1, 2, and 6, an embodiment of a palletizing robot 100 includes a rotary base 20, a lifting frame 30, an extensible mechanical arm 40, a balancing mechanism 50, and an end-effector 60. The lifting frame 30 is rotatably connected to the rotary base 20. The extensible mechanical arm 40 is slidably connected to the lifting frame 30. The balancing mechanism 50 and the end-effector 60 are located on opposite ends of the extensible mechanical arm 40 respectively. In the illustrated embodiment, the end-effector 60 is a vacuum chuck. The rotary base 20 may be substantially columnar in shape.

The lifting frame 30 includes a base portion 31, a top portion 32, and two support plates 35. The two lifting plates 35 interconnect the base portion 31 and the top plate 32, and are positioned opposite to each other. Each support plate 35 includes a pair of sliding rails 351 at an inner surface facing each other.

Figure 3:
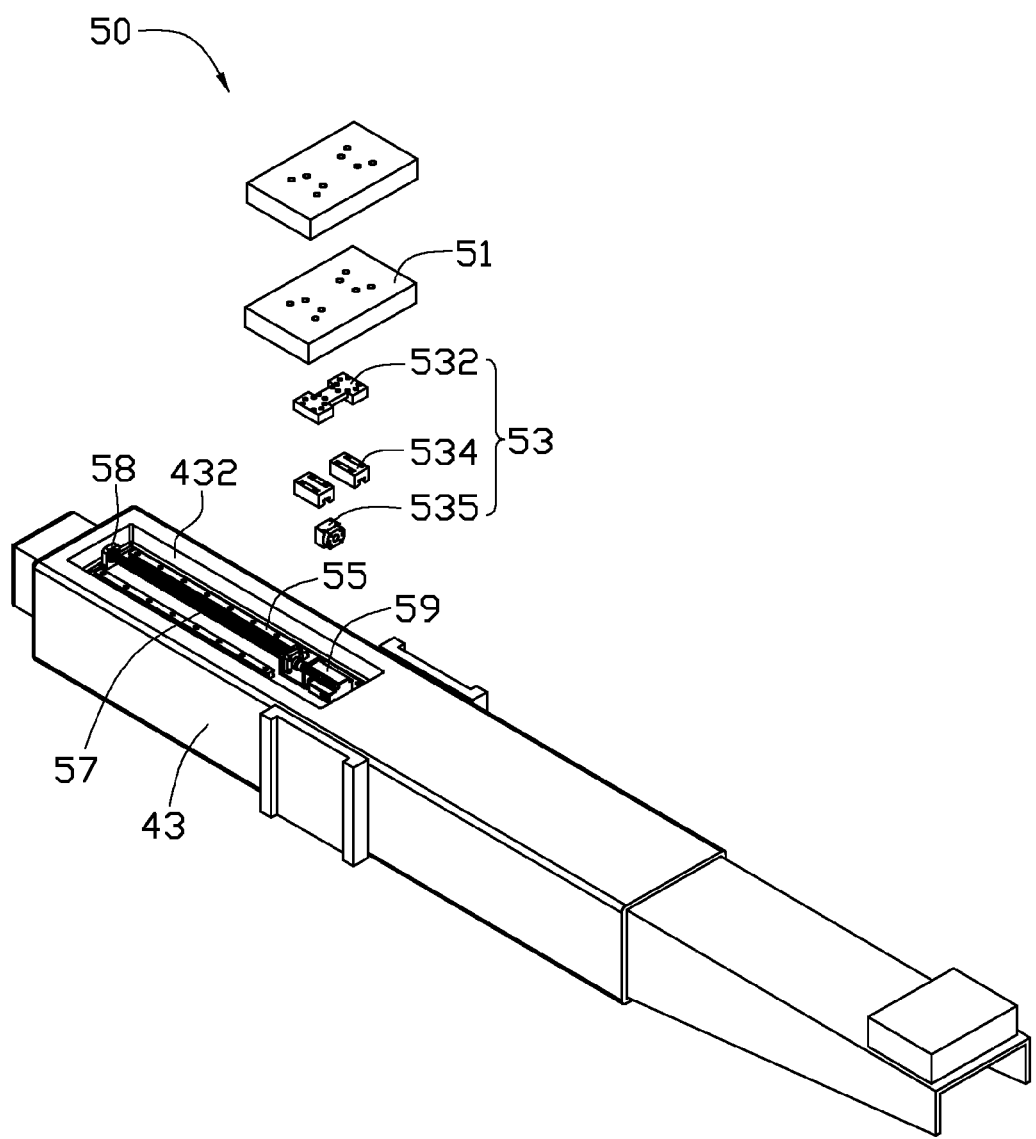
FIG. 3 is a partial, exploded, isometric view of the balancing mechanism shown in FIG. 1.

Referring to FIG. 3, the extensible mechanical arm 40 includes a pair of limiting members 41, a main body 43, an extension arm 45, a holding member 47, and an elevator (not shown). The main body 41 may be an elongated hollow rod. The limiting members 41 are fixed on opposite surfaces at one end of the main body 43. Each limiting member 41 defines a pair of sliding grooves (not shown) receiving a corresponding pair of sliding rails 351 of the two lifting plates 35. An end of the extension arm 45 movably sleeves on a distal end of the main body 43 such that the extension arm 45 can extend out from the distal end of the main body 43. The holding member 47 is fixed on the other end of the extension arm 45 away from the main body 43. The elevator is disposed on the lifting frame 30 to slide the pair of limiting members 41 relative to the lifting frame 30 and also control a sliding direction of the limiting members 41 with the main body 43. Thus, the holding member 47 can be moved to any position in a three dimensional space depending on the rotation of the rotary base 20, the sliding position of the extensible mechanical arm 40, and the extension of the extension arm 45 of the extensible mechanical arm 40.

Referring to FIG. 3 again, the balancing mechanism 50 includes a pair of counterweights 51, a sliding member 53, a pair of guide rails 55, a threaded rod 57, two fixing members 58, and a driving member 59.

The counterweights 51 are fixed on the sliding members 53 to balance the object 70.

Figure 4:
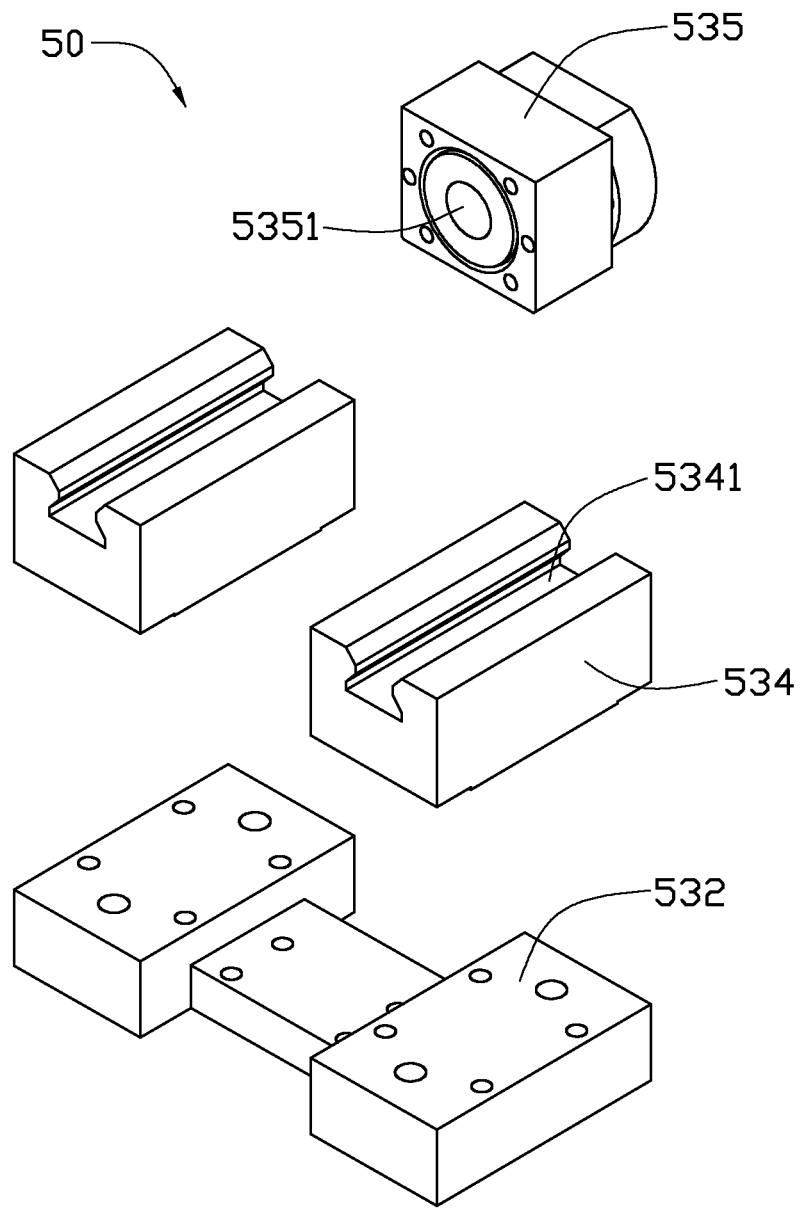
FIG. 4 is an exploded, isometric view of the sliding member shown in FIG. 3.

Referring to FIG. 4, the sliding member 53 includes a connecting block 532, two sliding blocks 534, and a threaded fastener 535. The connecting block 532 is substantially I-shaped. The counterweights 51 are fixed on the connecting block 532. The two sliding blocks 534 are fixed on opposite ends of the connecting block 532. Each sliding block 534 defines a sliding groove 5341 in a side surface of each sliding block 534. In the illustrated embodiment, the sliding groove 5341 is a dovetailed groove. The threaded fastener 535 is fixed in a middle portion of the connecting block 532 between the two sliding blocks 534. The threaded fastener 535 defines a threaded hole 5351 in a middle portion of the threaded fastener 535. The threaded rod 57 passes through the threaded hole 5351.

Figure 5:
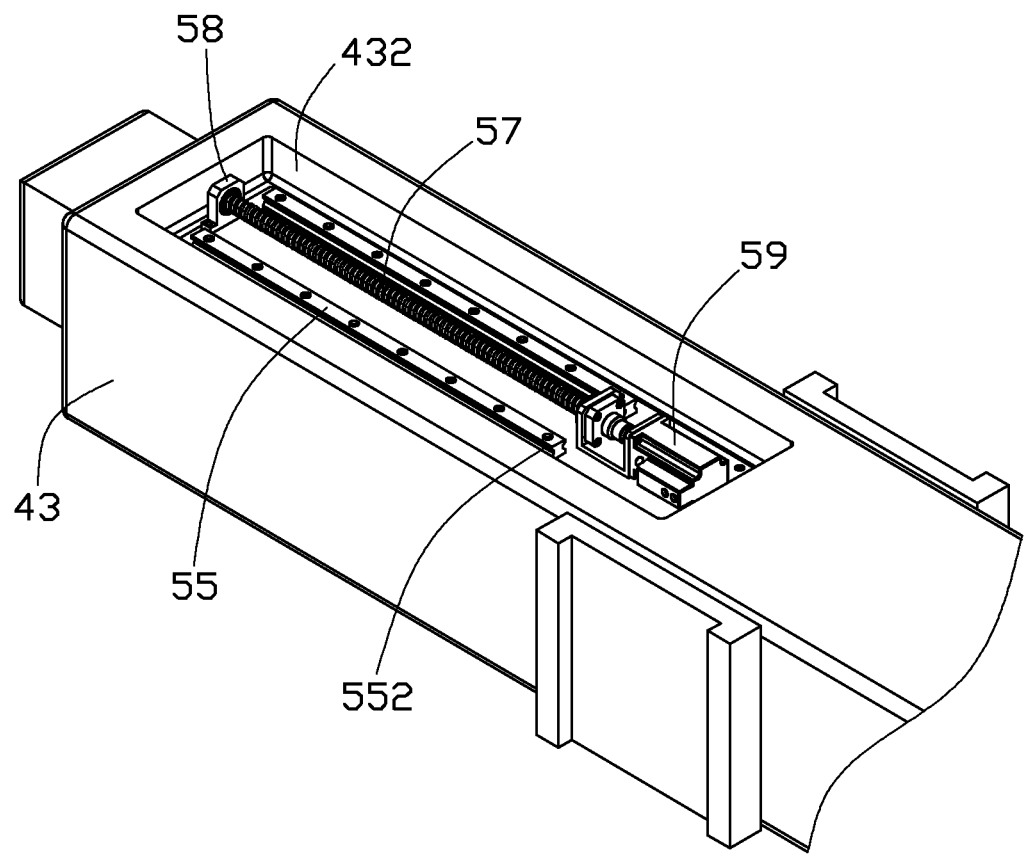
FIG. 5 is a partial, isometric view of the balancing mechanism shown in FIG. 3.

Referring to FIGS. 3 and 5, the pair of guide rails 55 are substantially parallel and fixed on a bottom of the receiving groove 432. Each guide rail 55 includes a guide rib 552. In the illustrated embodiment, the guide rib 552 is dovetailed. The two fixing members 58 are fixed on the bottom of the receiving groove 432 between the pair of guide rails 55. The threaded rod 57 passes through the two fixing members 58 and fixed to the driving member 59. The driving member 59 rotates the threaded rod 57 such that the threaded fastener 535 of the sliding member 53 slides relative to the threaded rod 57. In the illustrated embodiment, the driving member 59 is a motor.

Referring to FIGS. 3 through 6, in use, the palletizing robot acquires an object 70. The driving member 59 of the balancing mechanism 50 rotates the threaded rod 57. The threaded fastener 535 of the sliding member 53 slides relative to the threaded rod 57 such that the counterweights 51 are moved along the extensible mechanical arm 40. The balancing mechanism 50, the object 70, and the lifting frame 30 cooperatively form a lever balance. Based on the principle of lever balance, a moment generated by the counterweights 51 and the sliding member 53 equals that of the holding member 47, the end-effector 60 and the object 70, as expressed in the following formula:

$$m_1 g \times l_1 = m_2 g \times l_2 \tag{1}$$

wherein $m_1 g$ represents a total weight of the counterweights 51 and the sliding member 53, $l_1$ represents the moment arm of the counterweights 51 and the sliding member 53, $m_2 g$ represents a total weight of the holding member 47, the end-effector 60, and the object 70, and $l_2$ represents the moment arm of the holding member 47, the end-effector 60, and the object 70.

According to formula (1), the moment arm of the counterweights 51 and the sliding member 53 is determined by the following formula:

$$l_1 = \frac{m_2 g \times l_2}{m_1 g} \tag{2}$$

wherein the moment arm $l_1$ is generated by the moment arm $l_2$ and the total weight $m_2 g$. When the moment arm $l_1$ or the total weight $m_2 g$ is changed, the driving member 59 rotates the threaded rod 57 such that the threaded rod 535 slides relative to the threaded rod 57. The counterweights 51 and the sliding member 53 are moved to a new balance position corresponding to the moment arm $l_1$ so that the extensible mechanical arm 40 remains balanced.

It should be pointed out that the palletizing robot 100 may further include a controller (not shown) automatically controlling the counterweights 51 and the sliding member 53 relative to the threaded rod 57.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A palletizing robot, comprising:
   a lifting frame;
   an extensible mechanical arm rotatably connected to the lifting frame;
   an end-effector located on an end of the extensible mechanical arm; and
   a balancing mechanism comprising a threaded rod located on the extensible mechanical arm, a sliding member received on the threaded rod, a driving member fixed on an end of the threaded rod, a counterweight fixed on the sliding member, and a pair of guide rails substantially parallel to each other and fixed on the extensible mechanical arm, wherein the driving member drives the threaded rod to rotate such that the sliding member slides relative to the threaded rod, and the sliding member comprises a connecting block, two sliding blocks fixed on opposite ends of the connecting block, and a threaded fastener fixed in a middle portion of the connecting block between the two sliding blocks, the threaded fastener engages with the threaded rod, the two sliding blocks is capable of sliding relative to the pair of guide rails, and the counterweight is fixed on the connecting block, such that the counterweight is capable of sliding relative to the extensible mechanical arm.

2. The palletizing robot of claim 1, wherein the extensible mechanical arm comprises a main body and an extension arm movably sleeved in a distal end of the main body.

3. The palletizing robot of claim 2, wherein the extensible mechanical arm further comprises a holding member fixed on an end of the extension arm away from the main body, and the end-effector is fixed on the holding member.

4. The palletizing robot of claim 2, wherein the extensible mechanical arm further comprises a pair of limiting members fixed on opposite surfaces at one end of the main body and slide relative to the lifting frame.

5. The palletizing robot of claim 4, wherein the lifting frame comprises a pair of sliding rails at an inner surface facing each other, and each limiting member defines a pair of sliding grooves engaged with the sliding rails.

6. The palletizing robot of claim 1, wherein the balancing mechanism further comprises two fixing members fixed on the extensible mechanical arm, and opposite ends of the threaded rod pass through the two fixing members.

7. The palletizing robot of claim 1, wherein the threaded fastener defines a threaded hole to receive the threaded rod.

8. A palletizing robot, comprising:
   a rotary base;
   a lifting frame rotatably connected to the rotary base;
   an extensible mechanical arm slidably connected to the lifting frame;
   an end-effector fixed on one end of the extensible mechanical arm and grasping an object; and
   a balancing mechanism fixed on the other end of the extensible mechanical arm, wherein the balancing mechanism comprises a threaded rod located on the extensible mechanical arm, a sliding member, and a counterweight, the sliding member comprises a connecting block, two sliding blocks fixed on opposite ends of the connecting block, and a threaded fastener fixed in a middle portion of the connecting block between the two sliding blocks, the threaded fastener engages with the threaded rod, the two sliding blocks is capable of sliding relative to the extensible mechanical arm, and the counterweight is fixed on the connecting block, such that the counterweight is capable of sliding relative to the extensible mechanical arm to balance the object.

9. The palletizing robot of claim 8, wherein the balancing mechanism further comprises a driving member fixed on an end of the threaded rod, and the driving member drives the threaded rod to rotate such that the sliding member slides relative to the threaded rod.

10. The palletizing robot of claim 9, wherein the extensible mechanical arm comprises a main body and an extension arm movably sleeved in a distal end of the main body.

11. The palletizing robot of claim 10, wherein the extensible mechanical arm further comprises a holding member fixed on an end of the extension arm away from the main body, and the end-effector is fixed on the holding member.

12. The palletizing robot of claim 10, wherein the extensible mechanical arm further comprises a pair of limiting members fixed on opposite surfaces at one end of the main body and slide relative to the lifting frame.

13. The palletizing robot of claim 12, wherein the lifting frame comprises a pair of sliding rails at an inner surface facing each other, and each limiting member defines a pair of sliding grooves engaged with the sliding rails.

14. The palletizing robot of claim 9, wherein the balancing mechanism further comprises two fixing members fixed on the extensible mechanical arm, and opposite ends of the threaded rod pass through the two fixing members.

15. The palletizing robot of claim 9, wherein the balancing mechanism further comprises a pair of guide rails substantially parallel to each other and fixed on the extensible mechanic arm, the two sliding blocks slide relative to the guide rails.

\* \* \* \* \*